United States Patent [19]
Head

[11] 3,925,090
[45] Dec. 9, 1975

[54] CELLULAR CEMENT COMPOSITION
[76] Inventor: James L. Head, P.O. Box 7431, Metairie, La. 70002
[22] Filed: Mar. 28, 1974
[21] Appl. No.: 455,716

[52] U.S. Cl. .................. 106/87; 106/90; 260/42.13
[51] Int. Cl.² ............................................. C04B 7/35
[58] Field of Search ............. 106/87, 90; 260/29.65, 260/42.13

[56] References Cited
UNITED STATES PATENTS

| | | | |
|---|---|---|---|
| 2,761,511 | 9/1956 | Billue | 106/90 |
| 3,211,675 | 10/1965 | Johnson | 106/90 |
| 3,216,966 | 11/1965 | Collins | 106/90 |

*Primary Examiner*—J. Poer
*Attorney, Agent, or Firm*—Cushman, Darby & Cushman

[57] ABSTRACT

A cellular cement composition obtained from reactants consisting essentially of Portland cement, water, a styrenated chlorinated polyester resin, aluminum flakes, and an alkali.

8 Claims, No Drawings

CELLULAR CEMENT COMPOSITION

This invention relates to an expanded cellular cement which is useful for interior and exterior walls, floors, and ceilings of buildings and to a method for making expanded cellular cement.

Although it is known in the art to make expanded cellular cement compositions, the use of expanded cellular cement compositions was not widely accepted until Johnson et al., in U.S. Pat. No. 2,560,871, taught a method for using a combination of aluminum flakes and sodium hydroxide to produce a gaseous expanding agent which provides a controllable reaction and predictable properties in the product.

The cellular cement composition prepared according to Johnson et al., while exhibiting various desirable characteristics, nonetheless exhibits certain disadvantages. For instance, it has been noted that this composition exhibits undesirable water-absorbent characteristics and its compression strength is not as high as is often desired or required.

Other known methods of making cellular cement or concrete compositions include that of King, Jr., U.S. Pat. No, 2,534,915, which requires the use of an organic sulfonate detergent in a formulation using sodium hydroxide and aluminum metal to provide the gaseous expanding agent. Sommer, U.S. Pat. No, 3,141,857, also teaches the necessity of using an organic sulfonate surfactant in an expanded cellular concrete in which polyvinyl chloride resin is used.

Attempts have also been made to produce expanded concrete and cement compositions including U.S. Pat. No. 3,021,291 to Thiessen; U.S. Pat. No. 3,600,481 to Lanz and U.S. Pat. No. 3,625,724 to Alvero.

It will be apparent from an examination of these references that while each of them teaches a method for obtaining cellular cement or concrete, there are practical difficulties in the utilization of the method of each. Thus, the Lanz method requires a multi-part form in which bottom portions are recirculated to a filling station, whereas Thiessen calls for a heating step during which an expandable polymer is expanded to improve the moisture-transmission characteristics of the product. The Alvero reference teaches the use of an expensive polyurethane additive or other film-forming plastic in conjunction with a liquefied gaseous blowing agent.

It is thus apparent that, despite the long period of time since the Johnson et al. patent, there is a need for a cellular cement composition which provides not only the desirable features of prior art compositions but which also provides a significant improvement in sound-proofing and heat-insulating properties as well as a significant reduction in the water absorbent properties of the composition as well as a significant improvement in the compression strength thereof.

It has now been found, in accordance with the invention, that the use of a styrenated chlorinated polyester resin prepared during the processing of the cellular cement and a higher proportion of water than used by Johnson et al. provides a cellular cement composition and a method of making aforesaid compositions which provides the above described advantages and which is markedly superior with respect to sound-proofing and heat-insulating properties, to the reduction of water-absorbent characteristics and to an increase in the compression strength thereof.

It has been found, according to this invention, that a cellular cement composition having the above described advantages is obtained from reactants consisting essentially of Portland cement, a styrenated chlorinated polyester resin precursor mix, aluminum flakes, and an alkali. It has further been found that mixing these reactants in the order indicated provides a reproducible means of obtaining the cellular compositions.

More specifically, the compositions of this invention are obtained by mixing vigorously and reacting in the following order these reactants:

a. from about 22% to about 28% by weight of water and from about 65% to about 70% by weight of Portland cement b. from about 5% to about 10% by weight of a styrenated chlorinated polyester precursor mix c. from about 0.04% to about 0.07% by weight of fine aluminum flakes and d. from about 0.10% to about 0.15% by weight of an alkali.

More specifically, it is preferred to mix the water and Portland cement vigorously for about two minutes, add thereto the styrenated chlorinated polyester precursor mix, and mix vigorously for about five minutes, add thereto the fine aluminum flakes and mix vigorously for about 30 seconds, and add the alkali and mix vigorously to the point of incipient gelation. The product is then poured into a mold and allowed to set.

In a preferred embodiment, the reactants used consist of about 24% by weight of water, about 69% by weight of Portland cement, about 7% by weight of the styrenated chlorinated polyester precursor mix, about 0.06% by weight of fine aluminum flakes and about 0.12% by weight of alkali.

Portland cement is a complex mixture of calcium aluminum silicates meeting standards promulgated by the American Society for Testing and Materials (ASTM), the Federal Specifications Board, the American Association of State Highway Officials, etc. Utilizing the ASTM specifications Portland cement may be divided into a type I, which is for general application and II–V which are of more specific application and are obtained by modifying type I.

Table I below gives the typical oxide compositions of various Portland cements.

TABLE I

|  | $SiO_2$ | $Al_2O_3$ | $Fe_2O_3$ | CaO | MgO | $SO_3$ | Loss | Insol |
|---|---|---|---|---|---|---|---|---|
| Portland, type I, % | 21.3 | 6.0 | 2.7 | 63.2 | 2.9 | 1.8 | 1.3 | 0.2 |
| Portland, type II, % | 22.3 | 4.7 | 4.3 | 63.1 | 2.5 | 1.7 | 0.8 | 0.1 |
| Portland, type III, % | 20.4 | 5.9 | 3.1 | 64.3 | 2.0 | 2.3 | 1.2 | 0.2 |
| Portland, type IV, % | 24.3 | 4.3 | 4.1 | 62.3 | 1.8 | 1.9 | 0.9 | 0.2 |
| Portland, type V, % | 25.0 | 3.4 | 2.8 | 64.1 | 1.9 | 1.6 | 0.9 | 0.2 |
| Portland white, % | 25.5 | 5.9 | 0.6 | 65.0 | 1.1 | 0.1 | * | * |
| Natural, % | 23.7 | 4.1 | 0.8 | 64.5 | 1.6 | 2.2 | 3.0 | * |
| High alumina, % | 5.3 | 39.8 | 14.6 | 33.5 | 1.3 | 0.1 | 0 | 4.8 |

* Not determined

Type I is for use in general concrete construction where special properties for types II, III, IV, and V are not required. It is noted that the variation in composition of types II–V may be achieved by varying the non-silica oxide content from the basic type I. Additionally, white Portland cement is one in which the iron oxide is so reduced in concentration that the product is practically white. Gray Portland cement may be obtained by intergrinding 5–10% of a black pigment or addition of carbon black to obtain a gray color. Whereas the present invention is directed towards the utilization specially of type I Portland cements, its application is within the skill of the cement maker to include the other Portland cement types within the purview of this invention.

"Portland cement," defined above, is made by sintering a mixture of starting materials, consisting mostly of calcium carbonate in the form of limestone and of aluminum silicates in the form of clay or shale. The sintering process causes chemical reactions to occur which result in the formation of nodules, or clinkers, which are mostly calcium silicates and aluminates. The Portland cement of commerce is pulverized clinker mixed with a small amount of gypsum (calcium sulfate).

Portland cements known as gray or brown cements may also be produced without the precautions exercised in making the white cement. Generally, either of these materials is preferred in the practice of this invention for reasons of economy, unless white Portland cement is needed for esthetic purposes.

Also usable in the compositions of this invention are colored Portland cements made by blending 5–10% of pigment with white cement. Among pigments which are acceptable in Portland cement are iron oxides for red, yellow, brown, and black colors; chromium oxide for green; manganese dioxide for black and brown; cobalt blue for blue; and carbon black for black.

Generally, "normal" or type I Portland cement is preferred for use in the practice of this invention, although there can be situations in which high early-strength Portland cement, that is, type III, will be selected for reduced curing and for-use time.

"Styrenated chlorinated polyester precursor mix," as used in the specification and claims, means a mixture of styrene monomer and an unsaturated polyester based on a chlorinated cyclic acid anhydride and a dihydric or polyhydric alcohol along with the necessary catalysts and accelerators.

Chlorinated cyclic acid anhydrides suitable for preparation of polyester compositions usable in the practice of this invention include 2,3-dicarboxy-1,4,5,6,7,7-hexachlorobicyclo-[2.2.1]-5-heptene anhydride, also known as chlorendic anhydride, obtainable from Hooker Chemical Co. and Velsicol Chemical Co. An equally suitable anhydride is 2,3-dicarboxy-5,8-endomethylene-5,6,7,8,9,9-hexachloro-1,2,3,4,4a,5,8,,8a-octahydronaphthalene anhydride, also known as Chloran TM, produced by Universal Oil Products Co. Either of these anhydrides is reacted with a glycol, such as ethylene glycol, propylene glycol, butylene glycol, hexylene glycol, and the like; or a polyol, such as glycerine or pentaerythritol, to afford the preferred chlorinated polyester resins used in the practice of this invention.

The precursor mixes of this invention contain from about 30% to about 40% by weight of styrene monomer and from about 70% to about 60% by weight of chlorinated polyester, such as Hetron 197, a product of Hooker Chemical Co. Most preferably, the precursor mixes contain about 35% of styrene monomer and about 65% of chlorinated polyester, plus catalysts and accelerators.

Among the catalysts which are suitable for curing the styrenated chlorinated polyester mixes used in the practice of this invention are methyl ethyl ketone peroxide, benzoyl peroxide, tertiary-butyl peroxide, cumene hydroperoxide, and dicumyl peroxide. The recommended amount of catalyst is from about 0.2 to about 0.8 parts by weight of catalyst per hundred parts of styrene chlorinated polyester resin mix. The preferred amount of catalyst is about 1% by weight, most preferably of methyl ethyl ketone peroxide.

In the precursor mix used in the present invention, an accelerator is added because the styrenated chlorinated polyester resin is cured at ambient temperature, rather than elevated temperatures. The amount of accelerator used is from about 0.2 to about 0.8 parts per hundred parts of styrene and chlorinated polyester, but preferably about 0.5 parts by weight. Although any of the common naphthenic accelerators can be used, cobalt naphthenate and manganese naphthenate are particularly preferred.

In producing the cellular cement of the instant invention by use of gas-forming material, aluminum is incorporated into the cement mix so as to react with hydroxides in the cement and produce hydrogen bubbles which permeate the cement mass. The aluminum used may be in the form of unpolished spherical pellets, flakes, or polished powder. The aluminum used in the practice of this invention preferably is free from grease and is in the form of fine flakes, such as those which will pass through a 300–400 mesh sieve. The particles have a high surface area and are used in an amount from about 0.04% to about 0.07% by weight of the total mixture of reactants.

"Alkali" as used herein, means the hydroxide of a Group I metal, such as sodium hydroxide, potassium hydroxide, and lithium hydroxide, which is readily soluble in water and which reacts rapidly with aluminum to form hydrogen. The preferred alkali for the purposes of this invention is sodium hydroxide. The amount of alkali added in the final mixing step prior to incipient gelation is from about 0.10% to about 0.15% by weight of the total charge. The amount is preferably about 0.12% by weight.

It will be understood that hydrogen evolved as a result of reaction between aluminum and the alkali forms discrete bubbles which cause the mass to expand in volume. These bubbles retain their identity during the setting of the cement, so that the final product is an expanded cement containing innumerable uniform pores within which the styrenated chlorinated polyester is distributed uniformly along with about 16% of uncombined water. The product prepared according to this invention has a density of about 45 to 60 pounds per cubic foot.

For best results, mixing of the reactants and pouring should be done at temperatures above 50°F. Otherwise, longer than specified times are required for the various mixing steps.

The cement product of this invention, when placed in suitable forms, expands to about 225% of its original volume. The products set so that the forms can be removed in about 24 hours. Therefore, a structure can be erected within a few days' time using the cement compositions of this invention.

The functions of the various reactants are thought to be as follows: Portland cement reacts with at least some of the water to form a complex hydrate characteristic of "set" cement. At least part of the cement probably reacts with the aluminum to generate hydrogen, as does the alkali present. However, the amount of alkali used is itself more than equivalent to the aluminum charged, so that the aluminum almost certainly reacts completely. The uncombined water, among other functions, provides mobility to the mix during pouring and handling.

Although the main function of the alkali is to reaction with aluminum and water to form hydrogen and sodium aluminate, the added alkali also probably aids in the rapid formation of the product of this invention by controlling the initial setting rate of the Portland cement.

The chlorinated polyester-styrene combination serves several functions, among which is to improve the consistency of the mix and to impede the coalescense of hydrogen bubbles so that a finely grained uniform structure with little tendency to settle and slump results.

The chlorinated polyester-styrene precurser mix is viscous (about 700 centipoises) and is uniformly distributed through the wet mix by the mixing procedure. While the cement is becoming hydrated, the chlorinated polyester-styrene precurser mix is polymerized under the influence of the catalyst and the accelerators so as to become an effective barrier to moisture permeability through each of the uniform minute pores of the cement composition. Thus, the cement product has a low tendency to absorb or transmit water.

The initmate coating of the chlorinated polyester-styrene polymer in the final cement foam also tends to decrease the alkaline content of the cement surfaces so that walls and ceilings made therefrom can be painted readily.

Thus, the end product is a low density, sound-proof, heat-impermeable cement which is useful for the manufacture of structural units, including building blocks, beams, slabs, pipe, and the like, as well as walls, floors, and exterior surfaces. Cellular cement is also used in small decorative items such as statuary and bird baths, as well as in bath tubs and burial vaults.

The following Example is typical of the manner in which the cellular cement of this invention is made:

Thirty-two gallons of water (266.6 pounds, 24.3% by weight) of water and eight 94-pound bags of Portland cement, type I (752 pounds, 68.6% by weight) were mixed vigorously for two minutes at ambient temperature. Then 75 pounds (6.9% by weight) of a styrenated chlorinated polyester precursor mix consisting of 65 parts of chlorinated polyester resin (Hetron 197, Hooker Chemical Co.), 35 parts of styrene, 0.5 part of cobalt naphthenate, and 1.0 part of methyl ethyl ketone peroxide was mixed vigorously with the foregoing water-cement mixture for five minutes. Then, 0.7 pound of fine aluminum flakes (300–400 mesh; 0.06% by weight) was added to the foregoing and vigorous mixing was continued for about 30 seconds. Finally, 1.4 pounds of sodium hydroxide (0.12% by weight) was added. Vigorous stirring was continued until incipient gelation was achieved, that is, until the mixture had plastic strength such that discrete bubbles to remain separate and continue to grow in size. This stage was usually reached within about 30 seconds of vigorous stirring after the addition of the sodium hydroxide. The mixture was then poured into an appropriate construction form and allowed to set overnight. The forms were then removed.

It will be understood that the critical time in the mixing operation is that during which the generation of the foaming agent takes place, that is, between the addition of the aluminum flakes and the pouring step. Under temperature conditions between about 60°F. and about 90°F., this time usually varies from about one minute to about five minutes. However, it should be understood that the mixing times recited above for the prior steps are normally unaffected by ambient conditions as long as the temperature is above about 50°F.

Other formulations which can be used in the practice of this invention include:

A:
35 gallons of water
8 94-pound bags of Portland cement, type III
70 pounds of polyester precursor mix
30 parts styrene
70 parts chlorinated polyester
0.7 parts manganese naphthenate
0.7 parts cumene hydroperoxide
0.5 pound aluminum flakes
1.8 pounds potassium hydroxide B:
30 gallons of water
8 94-pounds bags of Portland cement, type I
77 pounds of polyester precursor mix
40 parts styrene
60 parts chlorinated polyester
0.3 parts cobalt naphthenate
1.2 parts dicumyl peroxide
0.9 pound aluminum flakes
1.2 pounds sodium hydroxide

What is claimed is:

1. A method for making cellular cement which comprises vigorously mixing for about two minutes from about 22% to about 26% by weight of water and from about 65% to about 70% by weight of Portland cement, adding from about 5% to about 10% by weight of a styrenated chlorinated polyester precursor mix and mixing vigorously for about five minutes, adding from about 0.04% to about 0.07% by weight of fine aluminum flakes and mixing vigorously for about 30 seconds, and adding from about 0.10% to about 0.15% by weight of an alkali and mixing vigorously to incipient gelation and pouring the product into a form and allowing said product to set.

2. The method of claim 1 wherein the styrenated chlorinated polyester precursor mix consists essentially of from about 30% to about 40% by weight of styrene and from about 70% to about 60% by weight of a polyester based on a chlorinated anhydride selected from the group consisting of 2,3-dicarboxy-1,4,5,6,7,7,-hexachlorobicyclo[2.2.1]-5-heptene anhydride and 2,3-dicarboxy-5,8-endomethylene-5,6,7,8,9,9-hexachloro-1,2,3,4,4a,5,8,8a-octahydronaphthalene anhydride and from about 0.6 to about 1.2 parts per hundred parts of styrene and polyester of a catalyst selected from the group consisting of methyl ethyl ketone peroxide, benzoyl peroxide, tertiary-butyl perbenzoate, cumene hydroperoxide, and dicumyl peroxide, and from about 0.2 to about 0.8 parts per hundred parts of styrene and polyester of an accelerator selected from the group consisting of cobalt naphthenate and manganese naphthenate.

3. The method of claim 1 wherein Portland cement is ASTM type I.

4. The method of claim 1 wherein reactants used are about 24% by weight of water, about 69% by weight of Portland cement, about 7% by weight of styrenated chlorinated polyester precursor mix, about 0.06% by weight of aluminum flakes, and about 0.12% by weight of alkali.

5. A cellular cement composition obtained by mixing vigorously and reacting in the following order:
   a. from about 22% to about 28% by weight of water and from about 65% to about 70% by weight of Portland cement
   b. from about 5% to about 10% by weight of a styrenated chlorinated polyester precursor mix
   c. from about 0.04% to about 0.07% by weight of fine aluminum flakes, and
   d. from about 0.10% to about 0.15% by weight of an alkali.

6. The cement composition of claim 5 wherein the styrenated chlorinated polyester precursor mix consists essentially of from about 30% to about 40% by weight of styrene and from about 70% to about 60% by weight of a polyester based on a chlorinated anhydride selected from the group consisting of 2,3-dicarboxy-1,4,5,6,7,7-hexachlorobicyclo[2.2.1]-5-heptene anhydride and 2,3-dicarboxy-5,8-endomethylene-5,6,7,8,9,9-hexachloro-1,2,3,4,4a,5,8,8a-octahydronaphthalene anhydride and from about 0.6 to about 1.2 parts per hundred parts of styrene and polyester of a catalyst selected from the group consisting of methyl ethyl ketone peroxide, benzoyl peroxide, tertiary-butyl perbenzoate, cumene hydroperoxide, and dicumyl peroxide, and from about 0.2 to about 0.8 parts per hundred parts of styrene and polyester of an accelerator selected from the group consisting of cobalt naphthenate and manganese naphthenate.

7. The composition of claim 5 wherein Portland cement is ASTM type I.

8. The composition of claim 5 obtained from about 24% by weight of water, about 69% by weight of Portland cement, about 7% by weight of styrenated chlorinated polyester precursor mix, about 0.06% by weight of aluminum flakes, and about 0.12% by weight of alkali.

* * * * *